3,694,169
LOW PRESSURE-DROP CATALYTIC REACTOR
Richard Fawcett, Arthur William Smith, and David Westwood, Norton, Stockton-on-Tees, England, assignors to Imperial Chemical Industries Limited, London, England
Filed May 25, 1970, Ser. No. 40,172
Claims priority, application Great Britain, May 28, 1969, 26,926/69
Int. Cl. B01j 1/04; C01c 1/04; C07c 29/16
U.S. Cl. 23—289     5 Claims

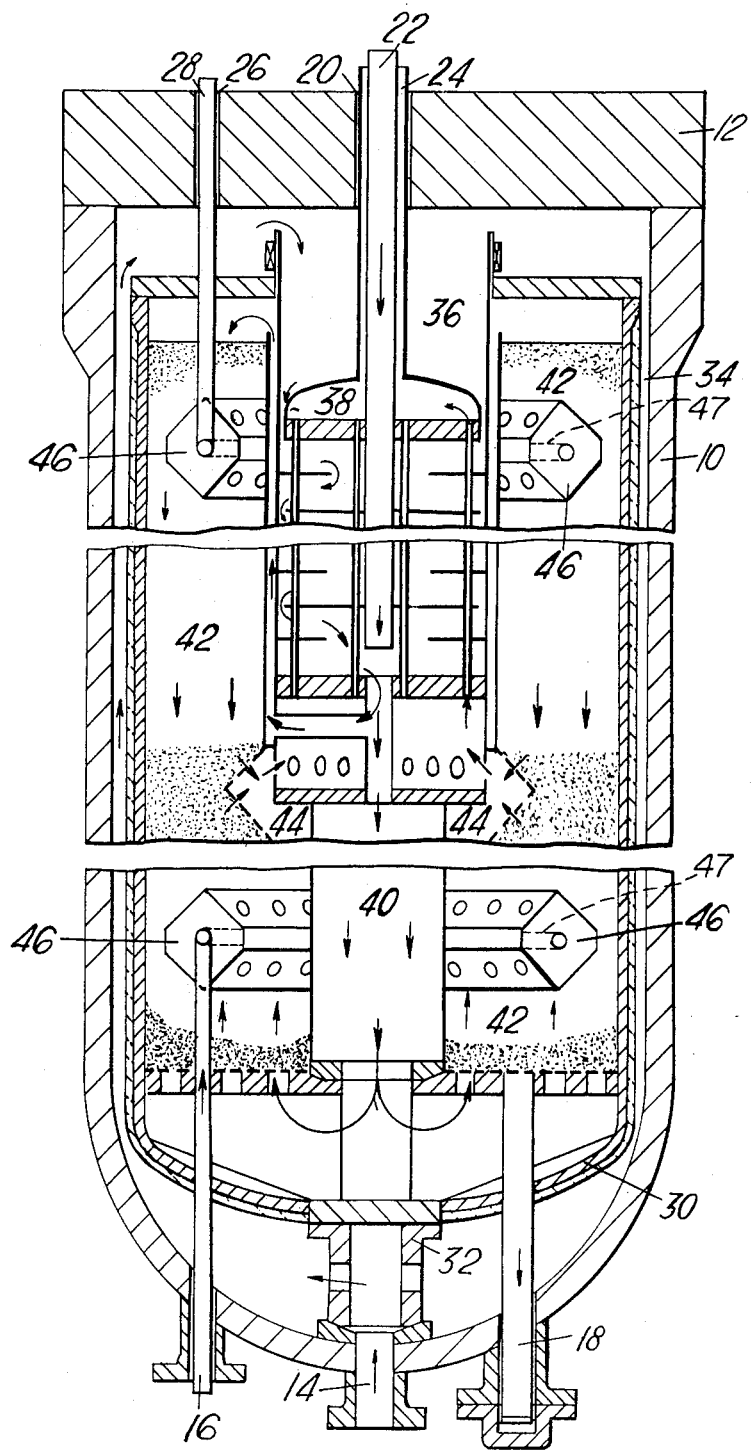

ABSTRACT OF THE DISCLOSURE

A reactor for synthesising ammonia or methanol comprises a pressure-resisting shell, a catalyst bed of annular section and a short axial heat exchanger. Preferably the reactant gas flows through the catalyst bed convergently towards an outlet near one end of the heat exchanger.

---

This invention relates to a reactor suitable for catalytic gas reactions especially the synthesis of methanol or ammonia.

The large rate of production of methanol or ammonia currently demanded has led to the development of large single-stream plants, since it has been found that the capital cost per ton of output is less the greater the output. Consequently the individual vessels, particularly the synthesis reactors in such plants designed to operate at medium pressures, have had to be made very large; and this has given rise to problems not encountered in previous smaller plants operated at higher pressures. One of such problems arises from the fact that it is difficult for pressure vessel fabricators to make satisfactory very large synthesis reactors. In order to attain the necessary volume the reactor can be of large diameter and moderate length; however the diameters now needed are too great for the machinery of many fabricators, especially when a full-bore closure is required. Alternatively the reactor can be of normal diameter and much increased length: in this event, however, if the synthesis gas passes axially through the reactor, the length of the catalyst bed is such that high pressure-drop is set up, which is unacceptable because of the resulting excessive compression and pumping energy needed in the operation of the plant. This is especially severe if at the same time a catalyst in the form of fine particles is used in order to increase catalytic activity. It has been proposed to shorten the gas path through the catalyst by arranging for the gas to flow in a radial direction through the catalyst. This however has given rise to difficulties due to back-diffusion in the catalyst during catalyst reduction and to inhomogeneous packing of the catalyst bed; and modified reactors have been proposed in which the pressure-drop is artificially increased.

We have now devised a new reactor which avoids or decreases the above-mentioned difficulties, yet is of a simple construction.

According to the invention a reactor comprises a pressure-resisting shell, a catalyst bed of annular section and a heat exchanger disposed within the space surrounded by the catalyst bed, and is characterised in that the heat exchanger extends to a portion of the total length of the catalyst bed, the remainder of the space being of a smaller internal diameter than the part occupied by the heat exchanger.

The heat exchanger extends to a length which is suitably between 20% and 80% of the total length of the catalyst bed, for example about 50%, the length required depending on the precise design parameters of the converter.

In this broadly defined form the reactor has the advantage that the highest pressure-drop region of the catalyst bed is limited to the region adjacent to the heat exchanger, the remainder of the bed being wider in cross-section and thus affording a lower pressure drop. Other advantages are exploited in preferred forms of the invention.

In reactors such as those according to the invention the purpose of the heat exchanger is to cool reacted gas by indirect heat exchange with incoming unreacted gas, which thus becomes heated. Consequently the gas passages within the reactor are arranged so that reacted gas leaving the catalyst is conducted out of the reactor by way of the hot side of the exchanger and incoming gas after passing through the cold side of the exchanger is conducted to the inlet of the catalyst bed.

In a preferred form of reactor according to the invention the outlet of the cold side of the heat exchanger is in flow communication with separated inlets, for example (in a vertical reactor) at the top and the bottom, of the catalyst bed, so that the stream of incoming gas leaving the heat exchanger is divided, one part being led (in a vertical converter) to the top of the catalyst bed, the other part being led to the bottom of the catalyst bed, whereafter the two flows converge and leave by a bed outlet disposed in the catalyst bed at an intermediate position which may be near the inlet to the hot side of the heat exchanger. Using this form of the reactor the two parts of the catalyst bed are used in parallel and hence the pressure-drop through the bed is, if the two parts are about equal, of the order of one-eighth what it would have been had all the gas been conducted through the whole of the catalyst bed. At the same time the flow connections can be very simple.

This form of the reactor preferably has all the catalyst disposed as a single body. This of course facilitates catalyst charging and discharging. It also makes upward gas flow practicable, since any tendency of the lower part of the bed to be lifted by the gas is effectively prevented by the downward force exerted by the upper part of the bed, both due to gravity and to the downward flow of gas in it. The catalyst bed outlet preferably comprises a wall member formed with ports or perforations and which extends from the reactor axis into the catalyst bed far enough to cause the gas to pass out through the ports or perforations preferentially to passing further through the catalyst bed. The wall member preferably defines a collecting chamber about the end of the heat exchanger.

This form of the reactor can alternatively contain two or more bodies of catalyst each having provision for simultaneous upward and downward flow and being connected with its own heat exchanger. In such a reactor the bodies of catalyst are preferably connected by passages (which may be closeable or not) for the entry of discharge of catalyst.

The reactor can include means for temperature control by quench gas injection, heat exchange tubes carrying cooler process gas or heat exchange means involving the use of auxiliary liquids such as water, "Thermex" (a mixture of diphenyl and diphenyl ether), or hydrocarbons and halogenated hydrocarbons. Preferably each catalyst bed includes at least one quench gas injection means as described in our U.K. Pat. 1,105,614, that is, a perforated hollow bar having associated with it a sparger, each hollow bar being large enough in cross-section for its interior to constitute a mixing zone and close enough to other bars or to the catalyst bed walls to cause a substantial proportion of reaction mixture to pass through the interiors of the bars. When a convergent flow system is used, each catalyst bed-part preferably contains at least one such injection means.

The catalyst bed can be enclosed in a basket in the manner commonly employed in synthesis reactors. The basket for reactors according to the invention preferably contains only one body of catalyst, which can thus easily be charged to or removed from the reactor without removing the basket. Hence it is unnecessary to provide the reactor with a full-bore closure through which the basket can be removed.

As a further feature of the invention there is provided a reactor cartridge, that, is the inner structure of the reactor as already defined and, in particular, a structure which comprises a cylindrical containing vessel, a catalyst support grid member near the bottom, and an axial tube, a first portion of which contains a heat exchanger and the remainder of which is mainly narrower than the first portion, and which tube is formed about its change of width with a perforated wall-member extending into the space between the containing vessel and the tube and defining an outlet from the catalyst bed and a collecting chamber for gas about the end of the heat exchanger. This cartridge includes also inlets for fresh gas, outlets for product gas, and inlets and outlets for catalyst, and is equipped for use with temperature control means, for example, the quench gas injection means described above.

The combination of the heat exchanger with the above-defined axial tube, for use in a reactor catalyst basket, is a yet further feature of the invention.

As an alternative to the use of a basket, the reactor can be lined with refractory concrete and surrounded by a cooling jacket. Again, a full-bore closure is not needed, since only one body of catalyst need be present.

Among the processes for which the reactor is suitable are the following.

(a) ammonia synthesis, carried out for example at pressures in the range 100–500 atmospheres and temperatures in the range 350–550° C. The pressure is preferably in the range 150–350 atmospheres measured at the circulating compressor outlet, that is, about 130–320 atmospheres at the reactor exit. The reactor is satisfactory for use in conjunction with centrifugal compressors. Preferably the catalyst particle size is in the range 3–12 mm., especially up to 9 mm.; and sizes down to 2 mm. are also very suitable.

(b) methanol synthesis over a copper-containing catalyst at pressures preferably in the range up to 200 atmospheres, especially 10–150 atmospheres, and temperatures in the range 160–300° C. especially 190–270° C.

One preferred form of reactor according to the invention is shown in axial sectional elevation in the accompanying drawing.

In the drawing outer shell 10 is provided wth a full-bore top closure 12, a cold-gas inlet port 14, quench gas inlet port 16 and one to three catalyst discharge ports 18. Closing 12 is provided with port 20, through which gas inlet pipe 22 and exit pipe 24 are disposed coaxially, and also with port 26 through which quench gas inlet pipe 28 passes. Catalyst basket 30 is supported on extension 32 of the cold gas inlet port 14 and is of such a diameter as to leave a cavity 34 inside the outer shell 10. Basket 30 is not required to withstand high pressures and consequently it is fabricated in lighter gauge metal than outer shell 10. It is clad with an outer layer of insulating material for most of its area. The whole structure inside the shell 10 is referred to herein as the "cartridge" or reactor inner structure.

The upper portion of basket 30 is formed with a wide axial space 36 containing heat exchanger 38, to the upper end of which gas inlet pipe 22 and outlet pipe 24 are connected, and the lower end of which is connected both to the upper and to the lower end of the catalyst bed. The lower portion of basket 30 is formed with narrow axial space 40 which leads from the lower end of heat exchanger 38 to the perforated underside of catalyst bed 42. Between the upper and lower axial spaces is disposed a perforated wall region 44 which constitutes the gas outlet from the catalyst bed to the hot side inlet of heat exchanger 38 and defines a collecting chamber about the end of the heat exchanger. The catalyst bed 42 is provided with two quench gas inlets each consisting of a sparger 47 disposed within a mixing zone free of catalyst. The length of the two parts of the catalyst bed 42 is approximately the same.

In the operation of the reactor for ammonia synthesis ports 14, 16, 22 and 28 are supplied with cold ammonia synthesis gas. The gas entering by port 14 passes upwards through cavity 34 and is heated somewhat, while preventing outer shell 10 from becoming heated above about 150° C. It then passes through the shell side (cold side) of heat exchanger 38 and is heated to the inlet temperature of the catalyst (about 380–450° C.). At the bottom of heat exchanger 38 it mixes with synthesis gas which has entered by pipe 22 (the latter gas is cooler, in order to afford a means of temperture control), and the mixture is divided, proportionately to the catalyst bed area, into two streams, one of which passes to the top of catalyst bed 42, the other to the bottom of catalyst bed 42. Synthesis takes place and the temperature rises to 450–550° C., but the gas now mixes at 46 with cold gas fed in through quench inlets 16 and 28, such that the temperature falls to 380–450° C. After a further passage through the catalyst bed, which is longer than the first passage before the quench zones since ammonia is synthesised at a lower rate once some has already been formed, further synthesis brings the temperature to the same high level as before. The flow rates are chosen so that this temperature is reached at the level of the region 44, at which the two gas streams leave the catalyst bed, enter the heat exchanger 38 and pass out through the tubes and into pipe 24, after heating up incoming synthesis gas.

A similar mode of operation is suitable for methanol synthesis as already mentioned.

It will be appreciated that modified reactors, having for example the heat exchanger at the bottom instead of the top or having different piping layouts and gas flow patterns may be made within the scope of the invention.

We claim:

1. A gas reactor comprising a pressure-resisting shell having an axis, a substantially annularly shaped catalyst bed in said shell, a heat exchanger disposed within said shell and surrounded by a portion of said catalyst bed, said heat exchanger having reactor inlet means leading to said catalyst bed through said heat exchanger and reactor outlet means leading from said catalyst bed through said heat exchanger, said heat exchanger having a relatively cold side and a hot side and catalyst bed inlet means comprising separated inlets, and catalyst bed outlet means comprising an outlet located intermediate said catalyst bed inlets, said separated catalyst bed inlets being in flow communication with said cold side of said heat exchanger so that incoming gas will flow convergently through said catalyst bed toward said catalyst bed outlet, said annularly shaped catalyst bed having a smaller radial thickness in the vicinity of said heat exchanger than in the remaining portion of said bed.

2. A reactor according to claim 1 in which the catalyst bed outlet comprises a wall-member formed with perforations and which extends from the reactor axis into the catalyst bed.

3. A reactor according to claim 2 in which the wall-member defines a collecting chamber about the end of the heat exchanger.

4. A reactor as claimed in claim 1 in which said catalyst bed includes at least one quench gas injection means comprising a perforated hollow bar having associated with it a sparger, said hollow bar being large enough in cross-section for its interior to constitute a mixing zone and close enough to other bars or to said catalyst bed walls to cause a substantial part of the reaction mixture to pass through the interiors of the bars.

5. A reactor as claimed in claim 4 in which each portion of said catalyst bed between a said catalyst bed inlet and said catalyst bed outlet contains at least one such quench injection means.

References Cited

UNITED STATES PATENTS

| | | | |
|---|---|---|---|
| 3,227,528 | 1/1966 | Jaeger | 23—289 |
| 3,424,553 | 1/1969 | Preusser et al. | 23—288 X |
| 3,458,289 | 7/1969 | King et al. | 23—288 |
| 3,556,738 | 1/1971 | Schober | 23—289 |
| 1,295,917 | 3/1919 | Medgyes | 23—289 |
| 2,391,315 | 12/1945 | Hulsberg | 23—288 K |

FOREIGN PATENTS 102,125   9/1937   Australia.

JOSEPH SCOVRONEK, Primary Examiner

U.S. Cl. X.R.

23—199, 288 K; 260—449.5